(12) United States Patent
Fujishiro et al.

(10) Patent No.: US 11,985,701 B2
(45) Date of Patent: May 14, 2024

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 281 days.

(21) Appl. No.: 17/371,625

(22) Filed: Jul. 9, 2021

(65) Prior Publication Data

US 2021/0337593 A1 Oct. 28, 2021

Related U.S. Application Data

(63) Continuation of application No. PCT/JP2019/048235, filed on Dec. 10, 2019.

(60) Provisional application No. 62/790,592, filed on Jan. 10, 2019.

(51) Int. Cl.
| | | |
|---|---|---|
| *H04W 74/08* | (2009.01) | |
| *H04W 24/08* | (2009.01) | |
| *H04W 48/16* | (2009.01) | |
| *H04W 74/0808* | (2024.01) | |

(52) U.S. Cl.
CPC ....... *H04W 74/0808* (2013.01); *H04W 24/08* (2013.01); *H04W 48/16* (2013.01)

(58) Field of Classification Search
None
See application file for complete search history.

(56) References Cited

U.S. PATENT DOCUMENTS

| | | |
|---|---|---|
| 9,936,515 B2 | 4/2018 | Fujishiro et al. |
| 10,555,193 B2 | 2/2020 | Matsumoto et al. |
| 10,966,244 B2 | 3/2021 | Shimomura et al. |
| 11,019,658 B2 | 5/2021 | Wee et al. |

(Continued)

FOREIGN PATENT DOCUMENTS

| | | |
|---|---|---|
| JP | 6030264 B1 | 11/2016 |
| JP | 2018-113674 A | 7/2018 |

(Continued)

OTHER PUBLICATIONS

ZTE;"Considerations on 4-step RACH procedure for NR-U"; 3GPP TSG RAN WG2 NR #103bis Meeting; R2-1813741; Oct. 8-12, 2018; 6 pages; Chengdu, China.

(Continued)

*Primary Examiner* — Srinivasa R Reddivalam

(74) *Attorney, Agent, or Firm* — Studebaker & Brackett PC

(57) ABSTRACT

A communication control method according to one embodiment is a method for a first communication apparatus to perform radio communication with a second communication apparatus in a cell operated in an unlicensed band. The communication control method includes configuring a first bandwidth part and a second bandwidth part having a narrower bandwidth than the first bandwidth part within a carrier frequency of the cell, measuring, by the first communication apparatus, disturbing wave power in the first bandwidth part and the second bandwidth part, and transmitting, by the first communication apparatus, a radio signal to the second communication apparatus by using a bandwidth part in which a disturbing wave is evaluated to not be present based on a result of the measurement.

3 Claims, 11 Drawing Sheets

(56) References Cited

U.S. PATENT DOCUMENTS

| | | | |
|---|---|---|---|
| 2016/0219604 A1 | 7/2016 | Fujishiro et al. | |
| 2018/0192365 A1 | 7/2018 | Feng | |
| 2019/0097765 A1* | 3/2019 | Jose | H04W 24/08 |
| 2020/0145858 A1 | 5/2020 | Matsumoto et al. | |
| 2020/0154480 A1* | 5/2020 | Jose | H04W 74/0825 |
| 2020/0221309 A1* | 7/2020 | Ozturk | H04W 74/0833 |

FOREIGN PATENT DOCUMENTS

| | | |
|---|---|---|
| JP | 2018-535566 A | 11/2018 |
| WO | 20160121672 A1 | 8/2016 |
| WO | 20170081800 A1 | 5/2017 |

OTHER PUBLICATIONS

3rd Generation Partnership Project;Technical Specification Group Radio Access Network; NR; NR and NG-RAN Overall Description; Stage 2(Release 15); 3GPP TS 38.300 V15.3.0 (Sep. 2018); pp. 1-92.

LG Electronics; "Frame structure for NR unlicensed operation", 3GPP TSG RAN WG1 Meetings #94bis, R1-1810266; Oct. 8-12, 2018; pp. 1-7; Chengdu, China.

3rd Generation Partnership Project; Technical Specification Group Radio Access Network; Study on NR-based access to unlicensed spectrum (Release 16); 3GPP TR 38.889 V16.0.0 (Dec. 2018); pp. 1-5.

ZTE; Considerations on mobility for NR-U, 3GPP TSG-RAN WG2 NR AH1807 Meeting; R2-1809838; Jul. 2-6, 2018; pp. 1-4; Montreal, Canada.

Ericsson; "Handling LBT failures" 3GPP TSG-RAN WG2 #104; TDoc R2-1817969; Nov. 12-16, 2018; pp. 1-5; Spokane, Washington USA.

Kyocera; "Reselection considerations for NR-U"; 3GPP TSG-RAN WG2 $#104; Nov. 12-16, 2018; pp. 1-4; Spokane, USA.

MediaTek Inc.; "Cell Selection and Reselection in NR-U"; 3GPP TSG-RAN2#104 meeting; Nov. 12-16, 2018; pp. 1-5; Spokane, USA.

ZTE; "LBT outcome indication"; 3GPP TSG RAN WG2 NR #104 Meeting, R2-1816831; Nov. 12-16, 2018; total 3 pages; Spokane, USA.

InterDigital; "SR in NR-U"; 3GPP TSG-RAN WG2 Meeting #103bis, R2-1814009; Oct. 8-12, 2018; total 6 pages; Chengdu, China.

ZTE; "Consideration on SR enhancement for NR-U operation"; 3GPP TSG RAN WG2 NR #104 Meeting, R2-1816833; Nov. 12-16, 2018; total 2 pages; Spokane, USA.

Vivo; "LBT impacts on BFD in NR-U"; 3GPP TSG-RAN WG2 Meeting #104, R2-1818267; Nov. 12-16, 2018; total 3 pages; Spokane, USA.

Oppo, "BWP switching due to LBT", 3GPP TSG-RAN WG2 Meeting #103bis, R2-1813589, Oct. 8-12, 2018, Chengdu, China, total 3 pages.

* cited by examiner

COMMUNICATION CONTROL METHOD

RELATED APPLICATIONS

The present application is a continuation based on PCT Application No. PCT/JP2019/048235, filed on Dec. 10, 2019, which claims the benefit of US Provisional Application No. 62/790,592 filed on Jan. 10, 2019. The content of which is incorporated by reference herein in their entirety.

TECHNICAL FIELD

The present disclosure relates to a communication control method in a mobile communication system.

BACKGROUND ART

In existing Long Term Evolution (LTE) of the 3rd Generation Partnership Project (3GPP), license-assisted access (LAA) is defined that enables LTE communication using both a licensed band being a frequency band for which a license is required and an unlicensed band being a frequency band for which a license is not required. Further, an unlicensed band may be referred to as an unlicensed spectrum.

In recent years, the 3GPP has standardized New Radio (NR) which is considered a 5th-generation (5G) radio access technology. Although the current NR specification does not define a mechanism to use an unlicensed band, the 3GPP has started discussion to introduce NR-U which is a technique using an unlicensed band in NR communication.

It is assumed that, in NR-U, an unlicensed band can be used alone without using both the unlicensed band and a licensed band. Under this assumption, a new function that LAA does not have is considered to be necessary.

CITATION LIST

Non Patent Literature

NPL 1: 3GPP Technical Specification "TS38.300 V15.3.0", September 2018, Internet <URL: http://www.3gpp.org/ftp//Specs/archive/38_series/38.300/38300-f30.zip>

SUMMARY

A communication control method according to one embodiment is a method for a first communication apparatus to perform radio communication with a second communication apparatus in a cell operated using an unlicensed band. The communication control method includes configuring a first bandwidth part and a second bandwidth part having a narrower bandwidth than the first bandwidth part within a carrier frequency of the cell, measuring, by the first communication apparatus, disturbing wave power in the first bandwidth part and the second bandwidth part, and transmitting, by the first communication apparatus, a radio signal to the second communication apparatus by using a bandwidth part in which a disturbing wave is evaluated to not be present based on a result of the measurement.

The communication control method according to one embodiment is a method used in a cell operated in an unlicensed band. The communication control method includes evaluating, when data to be transmitted from a first communication apparatus existing in the cell to a second communication apparatus is generated, whether a disturbing wave is present by measuring, by a physical layer of the first communication apparatus, disturbing wave power in the unlicensed band, performing, by the physical layer, the evaluating in response to an instruction from an upper layer of the first communication apparatus to the physical layer even when no data to be transmitted from the first communication apparatus to the second communication apparatus is generated, and notifying, by the physical layer, the upper layer of a result of the evaluating performed in response to the instruction.

A communication control method according to one embodiment includes evaluating, by a user equipment in a radio resource control (RRC) connected state in a cell operated in an unlicensed band, a congestion level of the cell by measuring disturbing wave power at a carrier frequency of the cell, detecting, by the user equipment, a radio link failure based on the evaluated congestion level, and performing, in response to the detecting the radio link failure, an RRC re-establishment process by selecting a cell different from the cell while the RRC connected state is maintained.

A communication control method according to one embodiment includes evaluating, by a user equipment in a radio resource control (RRC) idle state or an RRC inactive state in a cell operated in an unlicensed band, a congestion level at a high priority frequency having a higher priority than a priority configured for a carrier frequency of the cell by measuring disturbing wave power at the high priority frequency, and skipping, by the user equipment, measurement for the high priority frequency for a certain period of time when the high priority frequency is evaluated to be congested.

A communication control method according to one embodiment includes evaluating, by a user equipment in an RRC idle state or an RRC inactive state in a cell operated in an unlicensed band, a congestion level by measuring disturbing wave power in the unlicensed band only when a predetermined condition is satisfied. The predetermined condition includes at least one of a condition that reception power of a radio signal received by the user equipment from the cell is lower than a threshold, a condition that the user equipment performs a tracking area update process or a radio access network (RAN) notification area update process via the cell, a condition that the user equipment performs a connection process with respect to the cell, or a condition that the user equipment performs a process of reselecting a cell different from the cell.

A communication control method according to one embodiment includes performing, in a cell operated in an unlicensed band, by a first communication apparatus, Listen Before Talk (LBT) before transmitting data from the first communication apparatus existing in the cell to a second communication apparatus is transmitted when the data is generated, measuring, by the first communication apparatus, the number of failures of the LBT, and detecting, by the first communication apparatus, a radio link failure between the first communication apparatus and the second communication apparatus based on the number of failures of the LBT has failed.

DESCRIPTION OF EMBODIMENTS

Figure 1:
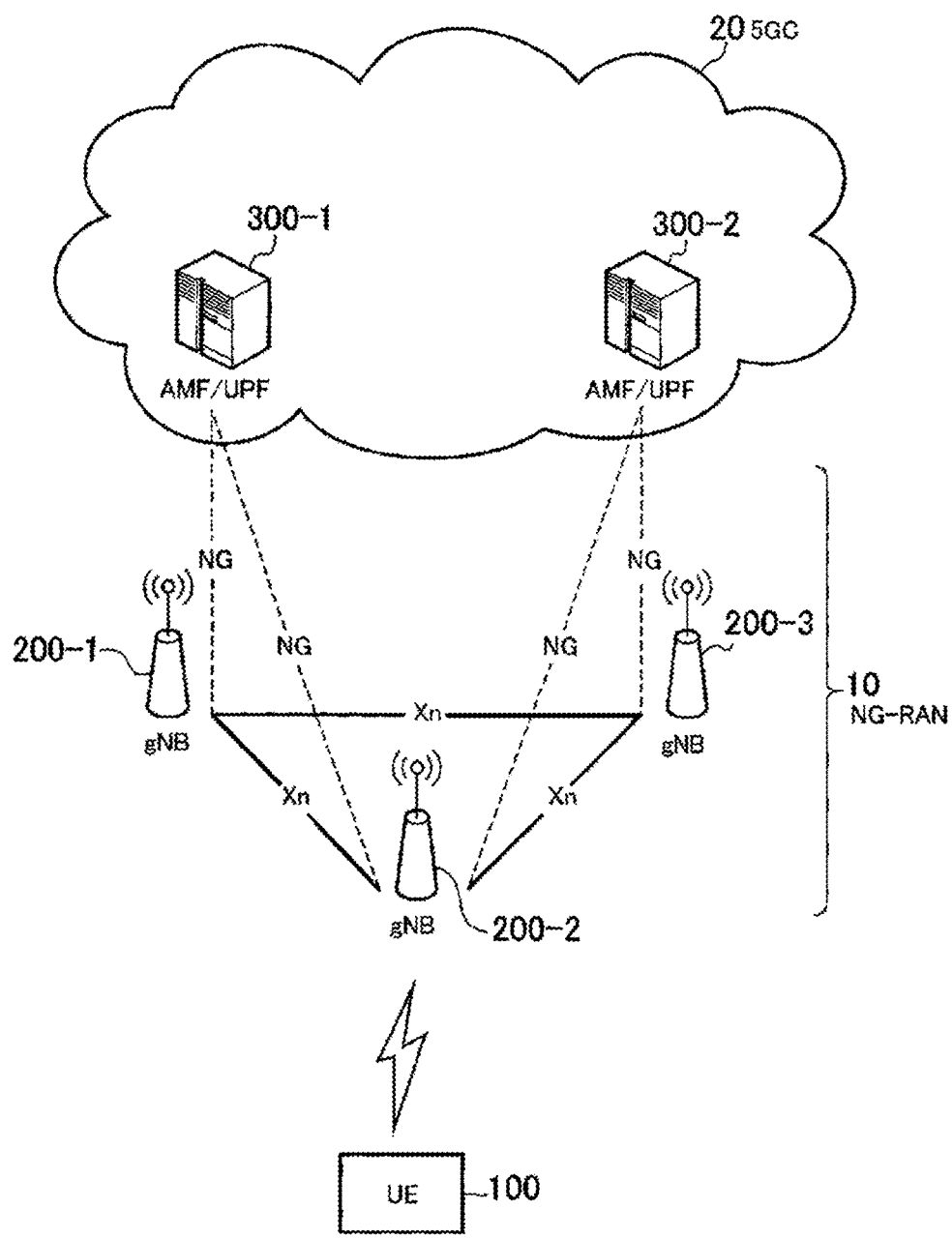
FIG. 1 is a diagram illustrating a configuration of a mobile communication system according to an embodiment.

A mobile communication system according to an embodiment will be described with reference to the drawings. In the description of the drawings, the same or similar parts are given the same or similar reference numerals.

Mobile Communication System

First, a configuration of a mobile communication system according to an embodiment will be described. Although the mobile communication system according to the embodiment is a 5G system of the 3GPP, LTE may be at least partially applied to the mobile communication system.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus as long as the UE is used by a user. Examples of the UE 100 include, for example, a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

Although a case in which the gNB 200 performs radio communication with the UE 100 will be primarily described below, an eNB may perform radio communication with UE 100 to control sidelink communication.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
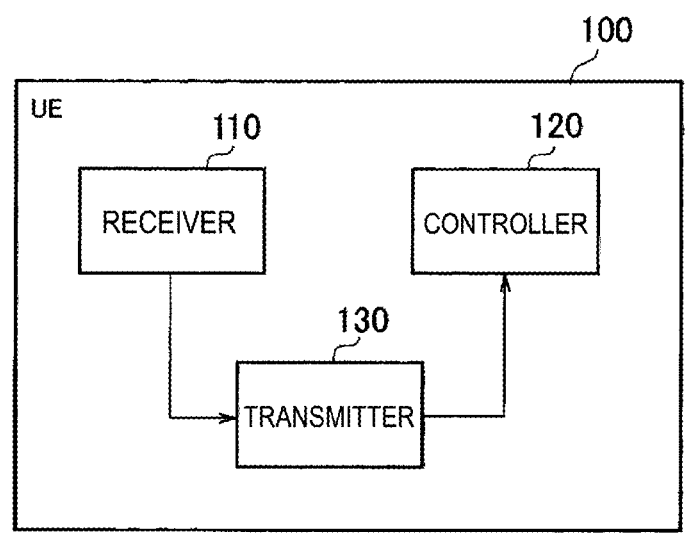
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various kinds of processes.

Figure 3:
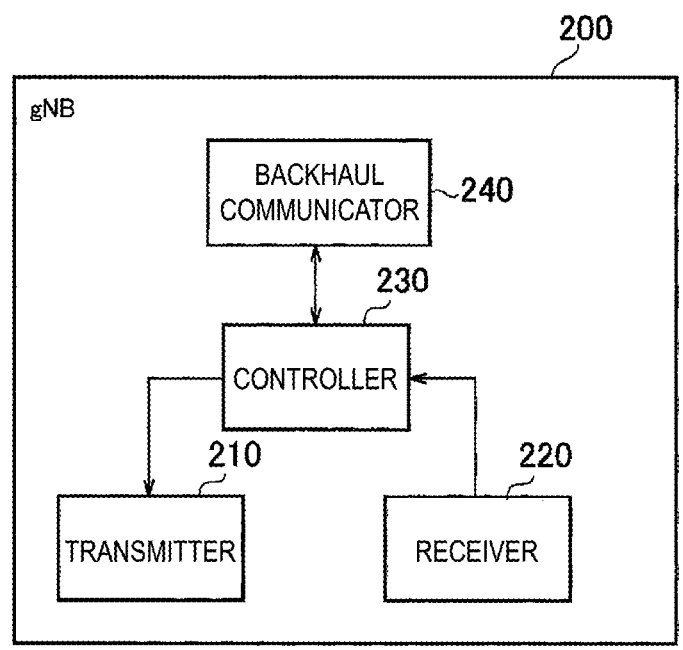
FIG. 3 is a diagram illustrating a configuration of a base station according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
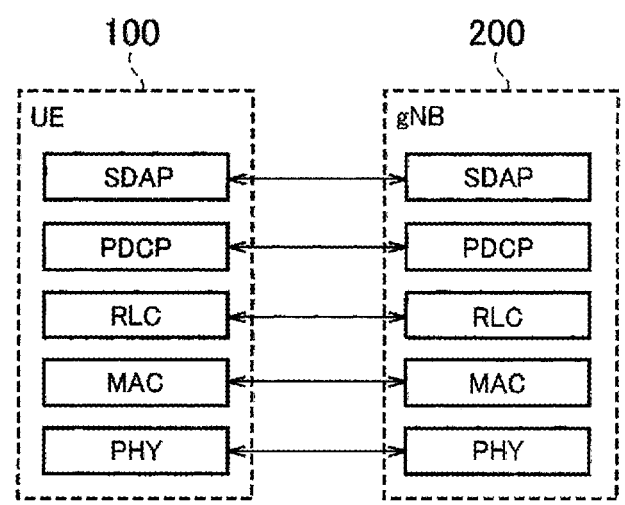
FIG. 4 is a diagram illustrating a configuration of a protocol stack of a radio interface of a user plane according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 5:
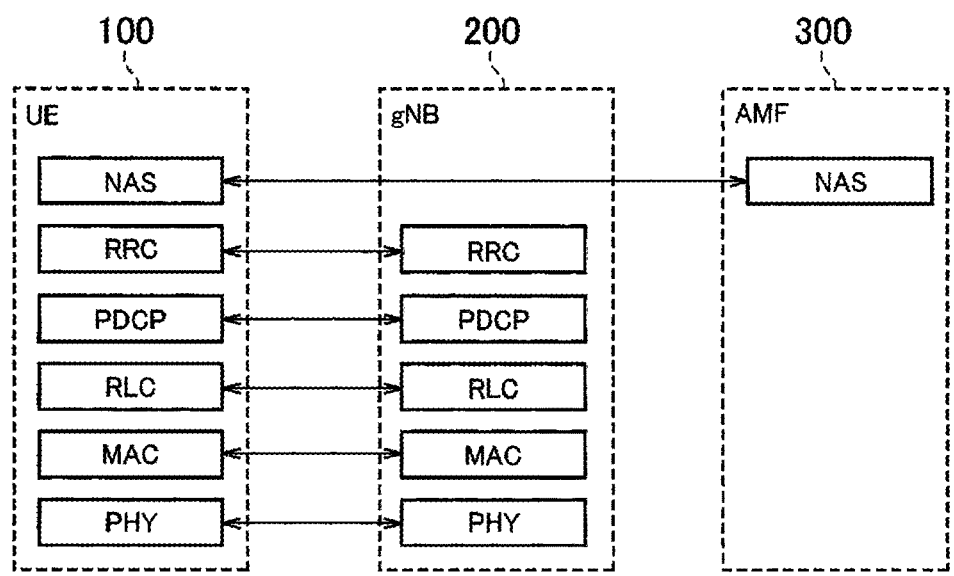
FIG. 5 is a diagram illustrating a configuration of a protocol stack of a radio interface of a control plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. Furthermore, when the RRC connection is interrupted (suspended), the UE 100 is in an RRC inactive state.

The NAS layer higher than the RRC layer performs session management, mobility management, and the like.

NAS signaling is transmitted between the NAS layer of the UE 100 and the NAS layer of the AMF 300.

Note that the UE 100 has an application layer and the like other than the protocol of the radio interface.

First Embodiment

Next, a first embodiment will be described based on the assumption of the mobile communication system described above. Each of embodiments to be described below is based on the assumption of NR-U using an unlicensed band in NR communication. The NR-U may use the unlicensed band alone without using both the unlicensed band and the licensed band.

In an unlicensed band, disturbing waves (interference waves) from other systems such as wireless LANs may be present, and a communication apparatus (the UE 100 or gNB 200) of the mobile communication system may interfere with other systems. Thus, in the unlicensed band, the communication apparatuses (the UE 100 and gNB 200) are required to apply Listen-Before-Talk (LBT) before performing transmission.

When LBT is applied, the UE 100 and the gNB 200 measure and monitor disturbing wave power of a channel to evaluate whether a disturbing wave is present, that is, whether the channel is empty or in use (busy).

When a disturbing wave is evaluated to not be present, that is, the channel is empty, the communication apparatuses can perform transmission. On the other hand, when a disturbing wave is evaluated to be present, that is, the channel is in use, the communication apparatuses are not able to perform transmission. The communication apparatuses consider LBT to be successful when a disturbing wave is evaluated to not be present and consider LBT to have failed when a disturbing wave is evaluated to be present. As a result, there is a problem in that opportunities for the communication apparatuses to perform transmission are limited in an unlicensed band.

Although uplink communication will be mainly described in the first embodiment described below, the first embodiment is also applicable to downlink or sidelink communication. Sidelink is a direct communication interface between UEs.

A communication control method according to the first embodiment is a method for a first communication apparatus to perform radio communication with a second communication apparatus in a cell operated in an unlicensed band. In uplink, the first communication apparatus is the UE 100 and the second communication apparatus is the gNB 200. In downlink, the first communication apparatus is the gNB 200 and the second communication apparatus is the UE 100. In sidelink, the first communication apparatus and the second communication apparatus are UE 100 different from each other.

In the first embodiment, at least a first bandwidth part and a second bandwidth part having a narrower bandwidth than the first bandwidth part are configured within a carrier frequency of a cell. A second bandwidth part having a narrower bandwidth than the third bandwidth part may be further configured.

A bandwidth part is a frequency part of a portion of an entire band of a cell. In NR, such a bandwidth part is referred to as a bandwidth part (BWP). A BWP is configured by the gNB 200 for the UE 100, and switching from one BWP to another BWP is controlled by the gNB 200. For example, if two BWPs are configured for the UE 100 and one BWP is active and the other BWP is inactive, the gNB 200 can perform control such that the active BWP switches from the one BWP to the other BWP. In addition, a subcarrier spacing and a cyclic prefix can be variably configured for each BWP.

Switching between BWPs is performed using downlink control information (DCI) or a deactivation timer transmitted on a physical downlink control channel (PDCCH). In a case where an inactivity timer is configured in a serving cell, when the inactivity timer associated with the cell expires, an active BWP is switched to a default BWP configured by a network.

Figure 6:
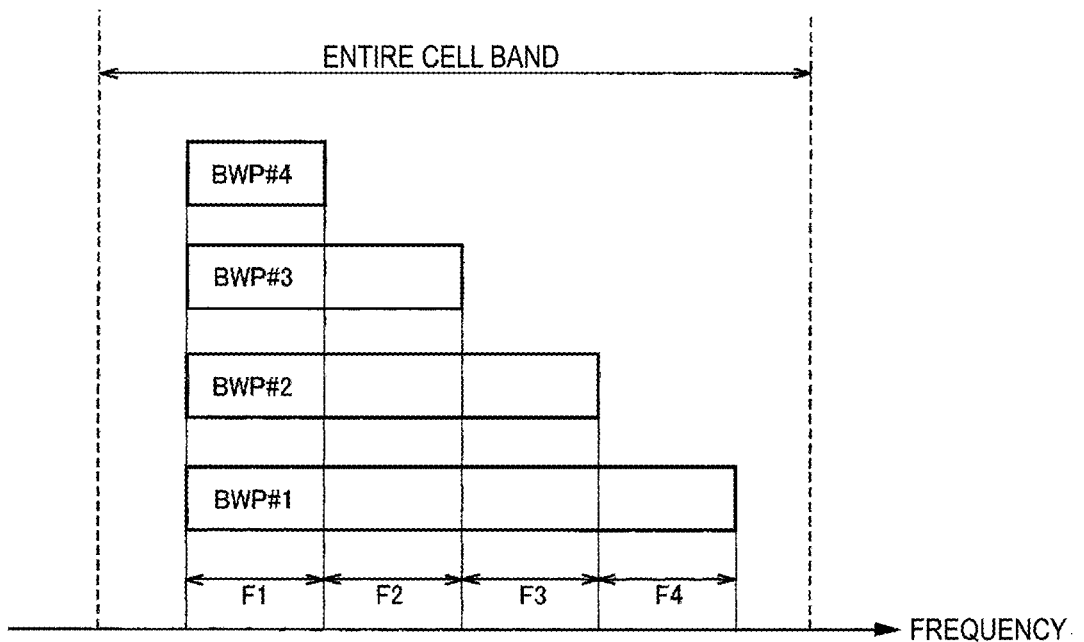
FIG. 6 is a diagram indicating an example of BWPs according to a first embodiment.

FIG. 6 is a diagram illustrating an example of BWPs configured for the UE 100. In FIG. 6, an example in which four uplink BWPs are configured is indicated.

As indicated in FIG. 6, the four BWPs include a BWP #1 having a widest bandwidth, a BWP #2 having a second widest bandwidth, a BWP #3 having a third widest bandwidth, a BWP #4 having a narrowest bandwidth. The gNB 200 configures the BWPs such that the BWPs overlap with each other in the frequency direction.

Note that, although an example in which each of the BWPs has a bandwidth that is an integer multiple of the narrowest bandwidth of the BWP #4 is introduced in FIG. 6, the bandwidth of each BWP may not be an integer multiple of the narrowest BWP. In addition, the subcarrier spacing of each of the BWPs may be the same or different from each other. At least one BWP of the plurality of BWPs may not overlap with the other BWPs in the frequency direction. Each of the plurality of BWPs may not overlap with each other in the frequency direction.

Figure 7:
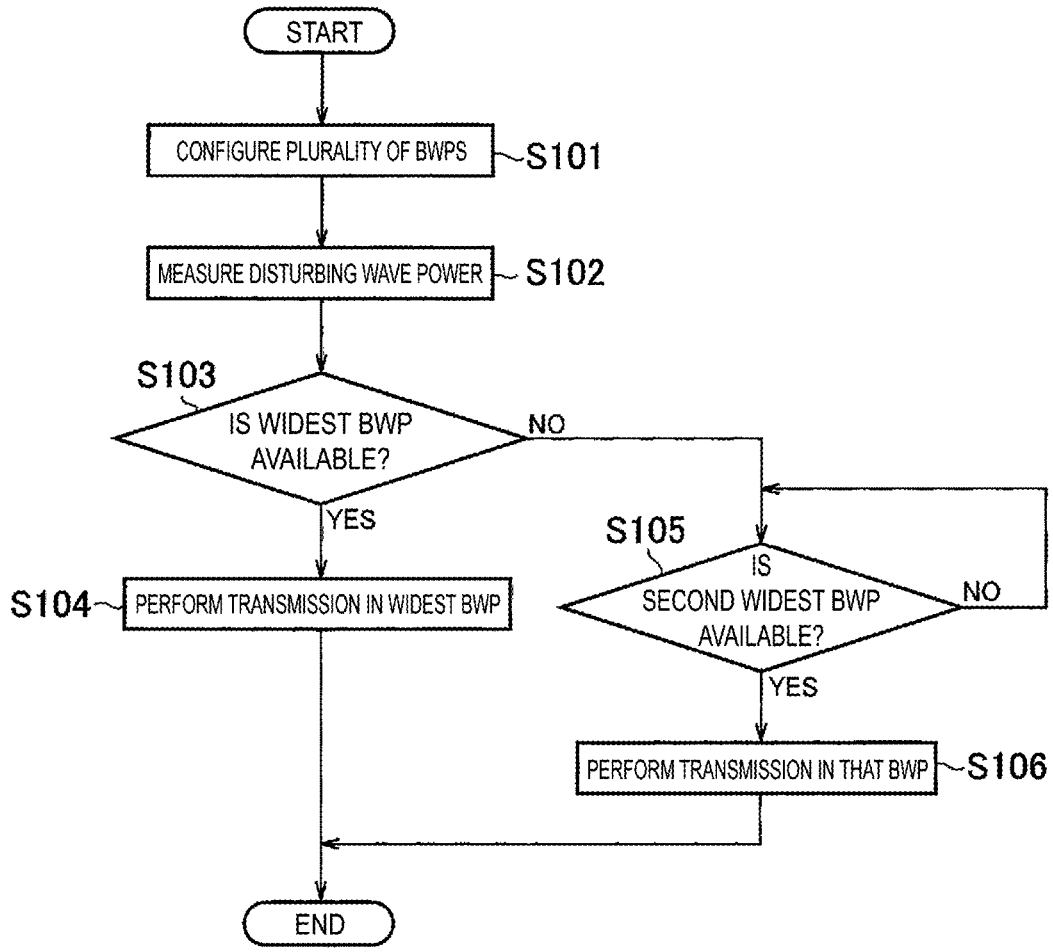
FIG. 7 is a diagram indicating a communication control method according to the first embodiment.

FIG. 7 is a diagram illustrating a communication control method according to the first embodiment. In the operation indicated in FIG. 7, it is assumed that the UE 100 is in the RRC connected state.

As indicated in FIG. 7, in step S101, a plurality of BWPs as indicated in FIG. 6 are configured by the gNB 200 for the UE 100. The BWPs may be configured using a system information block (SIB) which is broadcast RRC signaling or may be configured by unicast RRC signaling (hereinafter referred to as dedicated RRC signaling).

In addition, the gNB 200 activates the plurality of BWPs configured. For example, the gNB 200 may transmit to the UE 100 DCI for activating the plurality of BWPs configured, or may simultaneously run the inactivity timers for the plurality of BWPs. Then, the gNB 200 monitors uplink transmission from the UE 100 for each BWP (i.e., attempts decoding). The uplink transmission may be physical uplink shared channel (PUSCH) transmission, physical uplink control channel (PUCCH) transmission, and/or transmission on another uplink channel.

In step S102, the UE 100 measures disturbing wave power in a configured and active BWP. Here, the UE 100 measures disturbing wave power in the widest BWP on a predetermined unit of frequency basis. The predetermined unit of frequency refers to the bandwidth of the narrowest BWP, the bandwidth of a resource block, or the bandwidth of a subcarrier. Note that the resource block includes a plurality of subcarriers.

For example, in FIG. 6, the UE 100 measures the disturbing wave power for each bandwidth of the BWP #4 in the band of the BWP #1. Specifically, disturbing wave power is measured for each of the bands F1 to F4 indicated in FIG. 6. Then, the UE 100 acquires the measurement result of the BWP #1 by integrating the disturbing wave powers F1 to F4, and acquires the measurement result of the BWP #2 by integrating the disturbing wave powers F1 to F3. Furthermore, the UE 100 acquires the measurement result of the BWP #3 by integrating the disturbing wave powers F1 and F2, and acquires the disturbing wave power of F1 as it is as the measurement result of the BWP #4. This allows the measurement results for the four BWPs to be efficiently acquired by simply measuring the disturbing wave power in a single BWP. Note that, when the measurement is performed in units of resource blocks or subcarriers, measurement results for each BWP can be acquired in a similar manner.

In step S103, the UE 100 evaluates whether a disturbing wave is present in the BWP #1 based on the measurement result acquired for the widest BWP #1. For example, the UE 100 compares the measurement result acquired for the BWP #1 with a threshold configured by the gNB 200 and if the measurement result is below the threshold, a disturbing wave is evaluated to not be present (i.e., LBT is successful). In this case, the BWP #1 is available. On the other hand, if the measurement result is equal to or greater than the threshold, a disturbing wave is evaluated to be present (i.e., LBT has failed). In this case, the BWP #1 is not available.

If a disturbing wave is evaluated to not be present in the BWP #1 (step S103: YES), the UE 100 performs uplink transmission to the gNB 200 using the BWP #1 in step S104.

On the other hand, if a disturbing wave is evaluated to be present in the BWP #1 (step S103: NO), the UE 100 evaluates in step S105 whether a disturbing wave is present in the BWP #2 based on the acquired measurement result for the next wide BWP #2.

If a disturbing wave is evaluated to not be present in the BWP #2 (step S105: YES), the UE 100 performs uplink transmission to the gNB 200 using the BWP #2 in step S106.

On the other hand, if a disturbing wave is evaluated to be present in the BWP #2 (step S105: NO), the UE 100 evaluates in step S105 again whether a disturbing wave is present in the BWP #3 based on the acquired measurement result for the next wide BWP #3.

In this way, the process is repeated until an available BWP is found. However, if the process is repeated up to the narrowest BWP #4 and LBT is evaluated to have failed in the BWP #4, the UE 100 performs this flow again from the beginning after a certain period of time elapses.

According to the first embodiment, even if the broad band LBT has failed particularly under the assumption that a disturbing wave is a narrow band signal, LBT may be successful when the evaluation is performed with narrow band LBT, and thus the LBT success ratio can be increased.

Modified Example of First Embodiment

In the first embodiment described above, an example in which the UE 100 evaluates LBT in order from a wide BWP to a narrow BWP has been described.

However, the order of evaluation may be configured by the gNB 200 and specified for the UE 100. For example, the gNB 200 may configure, for the UE 100, priorities for LBT evaluation through dedicated RRC signaling. The UE 100 evaluates LBT for each BWP in accordance with the priorities configured by the gNB 200.

As a result, for example, it can be expected that the gNB 200 configures an individual BWP priority for each UE 100 to distribute BWPs to be used by the UE 100 for transmission. This allows the probability of LBT failure to be lowered in the whole system.

At least one BWP of a plurality of BWPs may not overlap with the other BWPs in the frequency direction, as described above. In other words, at least one BWP of the plurality of BWPs may be separated from the other BWPs in the frequency direction. The plurality of BWPs may be separated from each other in the frequency direction.

In this case, even if LBT is evaluated to have failed in the plurality of BWPs overlapping in the frequency direction, the UE 100 may be successful in LBT in BWPs separated from each other in the frequency direction. In other words, when a disturbing wave is present in the band F1 indicated in FIG. 6, the flow needs to be performed from the beginning again after a predetermined period of time elapses in the operation flow indicated in FIG. 7, but such a possibility can be reduced. As a result, the probability of LBT failure may be reduced.

Second Embodiment

Next, a second embodiment will be described while focusing on differences from the above-described first embodiment.

The evaluation of whether a disturbing wave is present in an unlicensed band (LBT check) is performed when transmission data is generated as described above. Specifically, when data to be transmitted to the second communication apparatus from the first communication apparatus existing in a cell operated in an unlicensed band is generated, the physical layer of the first communication apparatus performs LBT check by measuring the disturbing wave power in the unlicensed band (see the first embodiment).

In NR-U, the UE 100 in the RRC idle state or the RRC inactive state may select, through a cell reselection process, a cell operated in an unlicensed band as a serving cell. Here, it is desirable for the UE 100 to reselect, through the cell reselection process, a cell in which no disturbing waves are present. Note that the serving cell of the UE 100 in the RRC idle state or the RRC inactive state may be referred to as a "cell to be camped on" by the UE 100.

However, the general cell reselection process is based on the principle that the UE 100 measures the reception power of a reference signal from the serving cell and the reception power of a reference signal from one or more neighboring cells and reselects a cell with the highest reception power (best cell) as its own serving cell. In a case where a disturbing wave is present in a cell in which the best reception state of a desired wave is acquired, it is not preferred to reselect the cell.

Thus, in NR-U, it is desirable to be able to perform LBT check even when no transmission data is generated.

Figure 8:
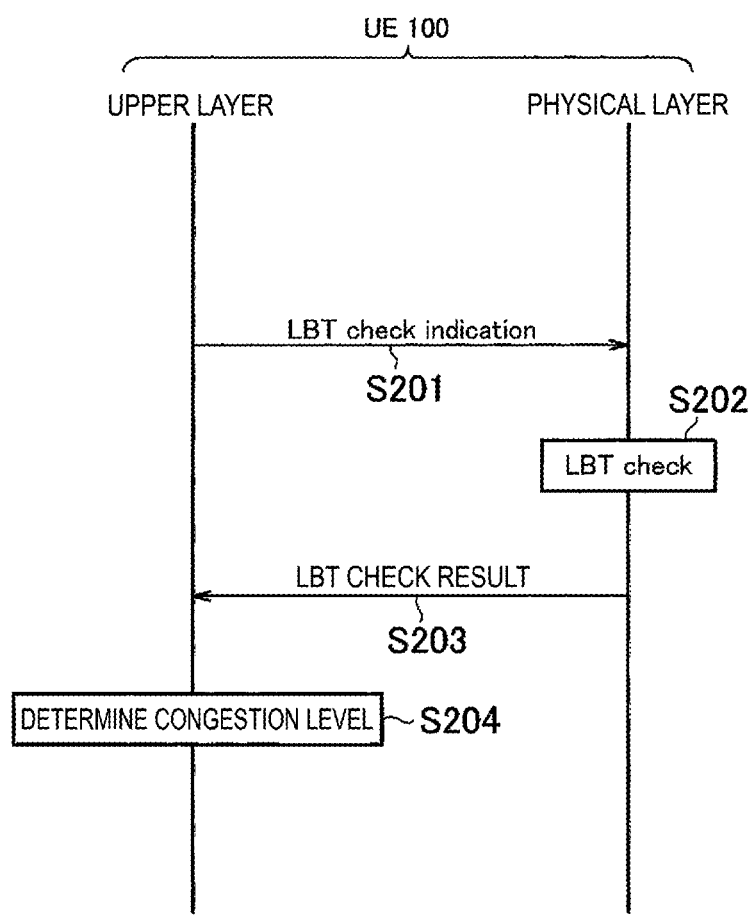
FIG. 8 is a diagram indicating a communication control method according to a second embodiment.

FIG. 8 is a diagram illustrating a communication control method according to the second embodiment. Here, although an operation of the UE 100 will be described as an example, the operation of FIG. 8 may be performed by the gNB 200. Note that, although it is assumed that the UE 100 is in the RRC idle state or the RRC inactive state in a cell operated in the unlicensed band, the UE 100 may be in the RRC connected state.

As indicated in FIG. 8, an upper layer of the UE 100 instructs the physical layer of the UE 100 in step S201 to perform LBT check even in a case in which data to be transmitted from the UE 100 (first communication apparatus) to another communication apparatus (second communication apparatus) is not generated. A specific example in which this instruction functions as a trigger will be described in a fifth embodiment.

Here, the upper layer may be an MAC layer or an RRC layer.

For example, the upper layer notifies the physical layer of an LBT check indication for instructing performance of LBT check. The upper layer may notify the physical layer of how many times the physical layer should perform LBT check (e.g., N times (N≥1)).

In addition, the upper layer may notify the physical layer of a carrier frequency or a channel for which an LBT check is to be performed. The LBT check may be performed for a serving frequency that is a carrier frequency of a serving cell, a band (channel) of a portion of the serving frequency, a neighboring frequency different from the serving frequency (specifically, a neighboring frequency belonging to an unlicensed band), and/or a band (channel) of a portion of the neighboring frequency.

In step S202, the physical layer of the UE 100 performs LBT check in response to the instruction from the upper layer. The physical layer may perform LBT check for the number of times notified of from the upper layer.

In step S203, the physical layer of the UE 100 notifies the upper layer of the result of the LBT check of step S202. For example, the physical layer notifies the upper layer of the fact that LBT was successful or LBT was failed. The physical layer may notify the upper layer of the results of a plurality of times of the LBT check (e.g., M successes, or L failures (M, L≥0)). The physical layer may notify the upper layer of the number of times LBT check was performed and the number of successes, and may not notify the upper layer of the number of failures. The physical layer may notify the upper layer of the number of times LBT check was performed and the number of failures, and may not notify the upper layer of the number of successes.

In step S204, the upper layer of the UE 100 determines (evaluates) the congestion level of the unlicensed band based on the notification from the physical layer. For example, in a case where LBT check was failed, LBT check was failed N times (N≥2) or more, and the ratio of the LBT check failure is equal to or greater than a threshold, the upper layer may determine that the carrier frequency or the channel for which the LBT check is to be performed is congested.

According to the second embodiment, LBT check can be performed even when transmission data is not generated due to interlayer coordination between the physical layer and the upper layer.

Third Embodiment

A third embodiment will be described while focusing on differences from the above-described embodiments. The third embodiment is an embodiment relating to radio link failure (RLF).

Normally, the UE 100 in the RRC connected state detects an RLF when a problem with radio is detected in the physical layer and the problem with radio is not recovered within a certain time, when a random access procedure fails, or when a failure in an RLC layer is detected. Here, the problem with radio in the physical layer is that out-of-sync occurs due to, for example, poor reception of synchronization signals from a serving cell.

Then, the UE 100 that has detected the RLF selects another suitable cell while maintaining the RRC connected state to start RRC re-establishment. However, if no suitable cell is found within a period of time after the RLF is detected, the UE 100 transitions to the RRC idle state.

However, in NR-U, it is desirable to introduce an RLF detection criterion taking a situation of disturbing waves into account in addition to the general RLF detection criterion as described above.

Figure 9:
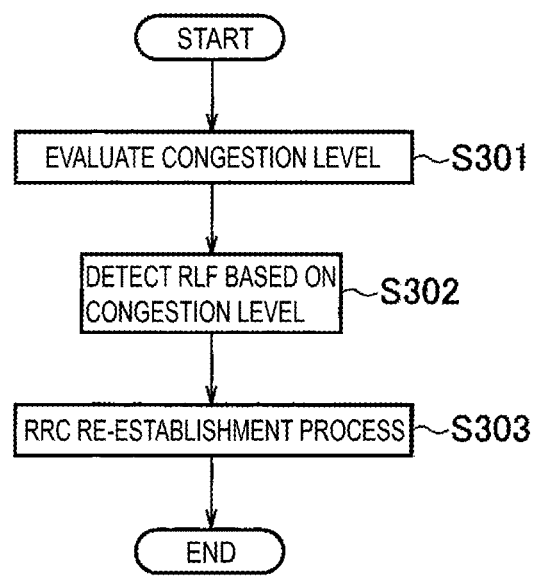
FIG. 9 is a diagram indicating a communication control method according to a third embodiment.

FIG. 9 is a diagram illustrating a communication control method according to a third embodiment. In this operation, the UE 100 is assumed to be in the RRC connected state in a cell operated in an unlicensed band.

As illustrated in FIG. 9, the UE 100 evaluates the congestion level of the serving cell by measuring disturbing wave power at the carrier frequency of the serving cell in step S301.

Here, a method for evaluating the congestion level is similar to those in the first and second embodiments described above. The method for evaluating a congestion level may be based on a channel occupancy rate (Channel occupancy). A "channel occupancy rate" is a ratio of received signal strength indicator (RSSI) sample values exceeding a threshold in a plurality of RSSI sample values measured in a certain period of time. These certain period of time and threshold may be configured by the gNB 200 for the UE 100. In addition, the gNB 200 may configure a timing at which RSSI measurement is to be performed for the UE 100. For example, the gNB 200 determines an RSSI measurement timing so that the UE 100 performs the RSSI measurement at the timing at which the gNB 200 does not transmit a radio signal. The gNB 200 may configure the determined RSSI measurement timing for the UE 100 using dedicated RRC signaling.

In step S302, the UE 100 detects an RLF based on the congestion level evaluated in step S301. For example, the UE 100 may determine that the serving cell is congested and detect an RLF if LBT check has failed, if LBT check has failed N times (N≥2) or more, if the percentage of LBT check failures is equal to or greater than a threshold, or if the channel occupancy rate is equal to or greater than a threshold.

Here, the UE 100 may detect an RLF when it is determined that the serving cell is congested even if the general RLF detection criterion described above is not satisfied. For example, the UE 100 may detect an RLF when it is determined that the serving cell is congested even if no problem with radio is detected in the physical layer (e.g., synchronization signals from the serving cell are successfully received).

In step S303, the UE 100 performs an RRC re-establishment process by selecting a cell different from the current serving cell while maintaining the RRC connected state in response to the detection of the RLF.

According to the third embodiment, the UE 100 can transition to another cell when the RLF detection standard suitable for NR-U is introduced and the serving cell is congested.

Note that, in a case in which dual connectivity is applied in NR-U, a similar detection criterion may be applied to a Secondary Cell Group (SCG)-RLF. Dual connectivity is a technique for the UE 100 to simultaneously communicate with a master base station and a secondary base station, and an SCG is a group constituted by secondary cells managed by the secondary base station. In this case, the serving cell in the above-described third embodiment may be read as a secondary cell.

In addition, the UE 100 that has detected the SCG-RLF may transmit information related to the SCG-RLF (SCG failure information) to the master base station. Here, as a type of failure (failure type), the UE 100 may include information indicating a failure caused by congestion (such as a channel being occupied) in the SCG failure information.

Fourth Embodiment

A fourth embodiment will be described while focusing on differences from the above-described embodiments. The fourth embodiment is one related to a cell reselection process in the RRC idle state or the RRC inactive state.

In the general cell reselection process, a frequency priority is configured by the gNB 200 for the UE 100, and the UE 100 performs the cell reselection process in consideration of frequency priorities. For example, the UE 100 performs measurement on a neighboring frequency (measurement of reception power for a desired wave) at all times when there is a neighboring frequency having a priority higher than the priority configured as a carrier frequency of a current serving cell. Such measurement is referred to as inter-frequency measurement.

However, in a case where a neighboring frequency with a high priority is congested in NR-U, it is not preferable to reselect a cell belonging to this neighboring frequency, and thus it is desirable not to perform measurement on this neighboring frequency. This allows the power of the UE 100 consumed due to the measurement to be saved.

In the fourth embodiment, the UE 100 in the RRC idle state or the RRC inactive state measures disturbing wave power at a high priority frequency having a priority higher than a priority configured at the carrier frequency of the current serving cell. As a result, the UE 100 evaluates the congestion level at the high priority frequency. A method for evaluating the congestion level is similar to those in the first to third embodiments described above.

Then, if the high priority frequency is evaluated to be congested, the UE 100 skips measurement for the high priority frequency for a certain period of time. Here, the value of a timer that defines the certain period of time may be configured using SIB or dedicated RRC signaling from the gNB 200 to the UE 100.

For example, if the high priority frequency is evaluated to be congested, the UE 100 may skip evaluation of the congestion level (i.e., measurement of disturbing wave power) for a certain period of time, or skip inter-frequency measurement (i.e., measurement of desired wave power) at the high priority frequency.

When the high priority frequency is evaluated to be congested, the UE 100 may suppress measurement by lowering the priority configured to the high priority frequency (e.g., assuming the priority as a lowest priority) for a certain period of time.

Figure 10:
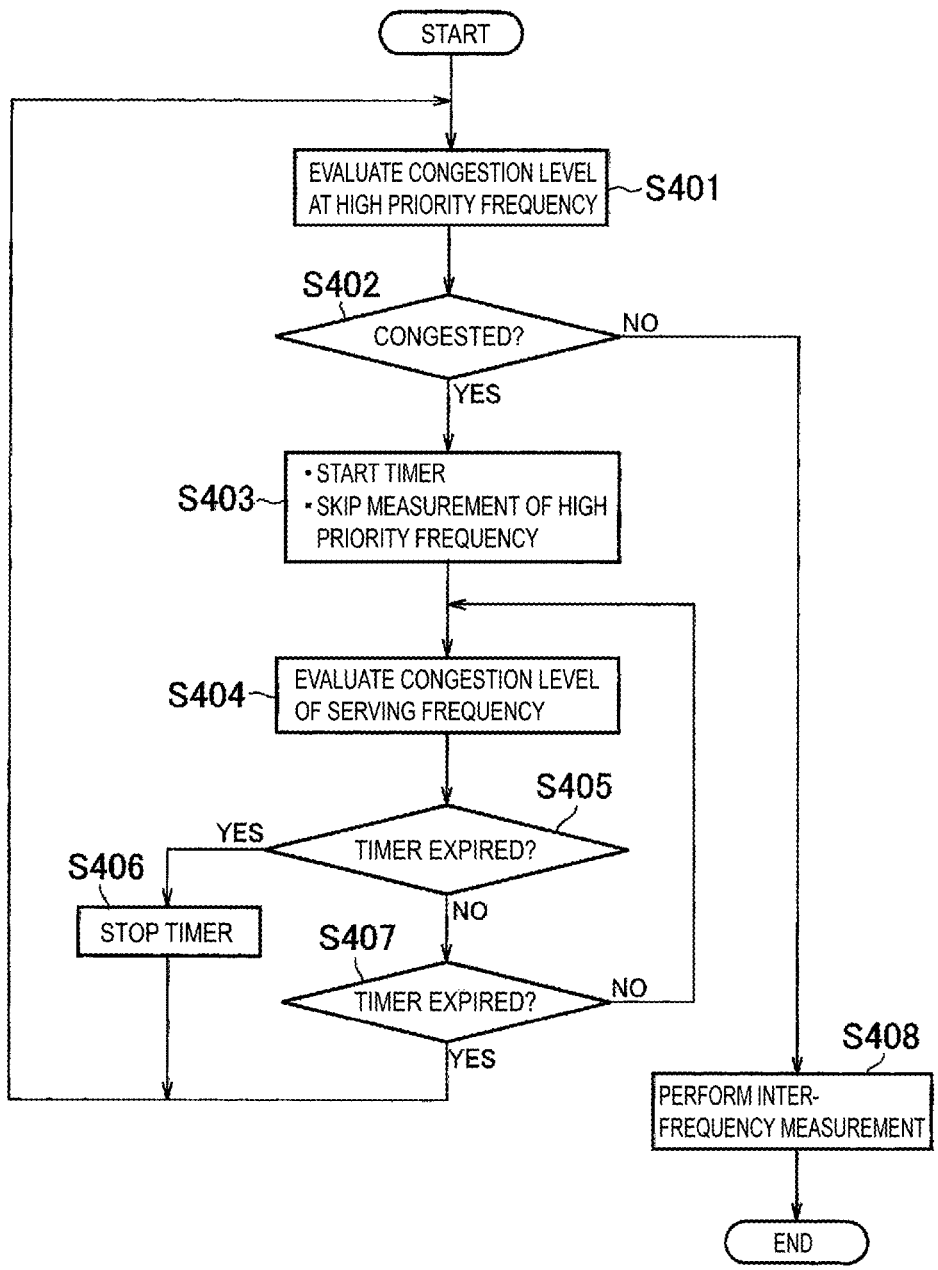
FIG. 10 is a diagram indicating a communication control method according to a fourth embodiment.

FIG. 10 is a diagram illustrating a communication control method according to the fourth embodiment. In this operation, the UE 100 is assumed to be in the RRC idle state or the RRC inactive state in a cell operated in an unlicensed band.

As illustrated in FIG. 10, the UE 100 evaluates the congestion level by measuring disturbing wave power at the high priority frequency in step S401.

If the high priority frequency is evaluated to be congested (step S402: YES), the UE 100 starts the timer and skips measuring the high priority frequency in step S403. The UE 100 continues to skip measurement for the high priority frequency while the timer is running.

In step S404, the UE 100 evaluates the congestion level by measuring the disturbing wave power at the serving frequency.

If the serving frequency is evaluated to be congested (step S405: YES), the UE 100 stops the timer in step S406 and returns the process to step S401.

On the other hand, if the serving frequency is evaluated to not be congested (step S405: NO), the UE 100 checks whether the timer has expired in step S407. If the timer has expired (step S407: YES), the UE 100 returns the process to step S401. If the timer has not expired (step S407: NO), the UE 100 returns the process to step S404.

According to the fourth embodiment, in a case in which a neighboring frequency with a high priority is congested, power consumed by the UE 100 can be saved by not performing measurement on the neighboring frequency.

Fifth Embodiment

A fifth embodiment will be described while focusing on differences from the above-described embodiments.

Because the above-described evaluation of congestion levels (in particular, measurement of a channel occupancy rate) requires the UE 100 to consume a large amount of power, it is desirable to reduce the time and number of times for the evaluation of congestion levels as much as possible.

Figure 11:
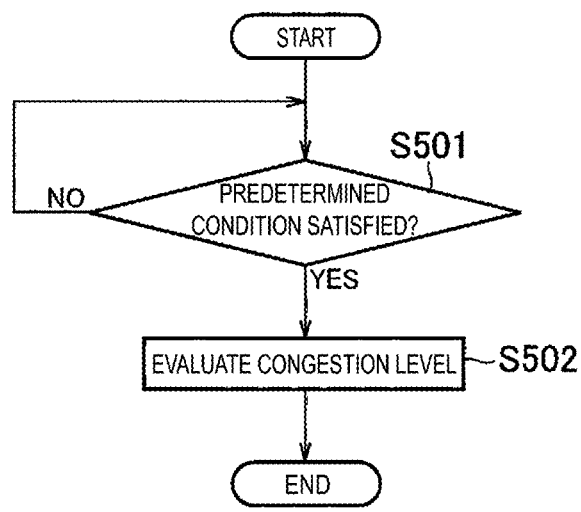
FIG. 11 is a diagram indicating a communication control method according to a fifth embodiment.

FIG. 11 is a diagram illustrating a communication control method according to the fifth embodiment. In this operation, the UE 100 is assumed to be in the RRC idle state or the RRC inactive state in a cell operated in an unlicensed band.

As illustrated in FIG. 11, the UE 100 evaluates a congestion level by measuring the disturbing wave power in the unlicensed band in step S502 if a predetermined condition is satisfied (step S501).

Here, although the evaluation of congestion level is basically based on the assumption of evaluation of congestion level of the current serving cell (serving frequency), it may also be applied to neighboring cells (neighboring frequencies). For example, the UE 100 may evaluate a congestion level of a neighbor cell (neighboring frequency) if the current serving cell (serving frequency) is congested. The UE 100 may evaluate the congestion level of the neighbor cell (neighboring frequency) if the priority configured for the current serving cell (serving frequency) is not the highest priority or the serving cell is not ranked at the top (i.e., the reception power of desired wave is the highest). Such operations may be applied in the embodiments described above as well.

A predetermined condition for performing the evaluation of congestion level may be a condition that reception power of the UE 100 to receive radio signals (desired wave power) from a serving cell is lower than a threshold. The radio signal may be a radio link monitoring reference signal (RLM-RS) or a synchronization signal and PBCH block (SSB). If the desired wave power is zero, the UE 100 may consider that the gNB 200 has failed in LBT and determine that the serving frequency is congested. If the UE 100 determines that the serving frequency is not congested, the UE may perform cell reselection for other cells with the same frequency. If the UE 100 determines that the serving frequency is congested, the UE 100 may perform inter-frequency measurement and perform cell reselection for other cells at neighboring frequencies.

A predetermined condition for performing the evaluation of congestion level may be a condition that the UE 100 performs a tracking area update (TAU) process or a RAN-based notification area update (RNAU) process via a cell. TAU is a process of performing, by the UE 100, notification to the AMF when the UE moves from one tracking area to another tracking area. RNAU is a process of performing, by the UE 100 in the RRC connected state, notification to the gNB 200 being a movement destination when the UE moves from one RAN-based notification area to another RAN-based notification area. Here, the UE 100 may perform the evaluation of congestion level for each of the serving frequency and the neighboring frequencies, and may perform transmission at a non-congested frequency among these frequencies.

A predetermined condition for performing the evaluation of congestion level may be a condition that the UE 100 performs a connection process with respect to the cell. The connection process may be physical random access channel (PRACH) transmission in a random access procedure or Msg3 (e.g., an RRC Request message) transmission in a random access procedure. Here, the UE 100 may perform the evaluation of congestion level for each of the serving frequency and the neighboring frequencies, and may perform transmission at a non-congested frequency among these frequencies.

A predetermined condition for performing the evaluation of congestion level may be a condition that the UE 100 performs a cell reselection process. Here, if the serving frequency is congested, the UE 100 may perform inter-frequency measurement.

Other Embodiments

Each of the embodiments described above may not only be separately and independently implemented, but also be implemented in combination of two or more embodiments.

Although the 5G system (NR) is primarily described in each of the embodiments described above, operations according to each embodiment may be applied to LTE.

Note that a program for causing a computer to execute each process performed by the UE 100 or the gNB 200 may be provided. The program may be recorded on a computer readable medium. The program can be installed in a computer by using the computer readable medium. Here, the computer readable medium on which the program is recorded may be a non-transitory recording medium. Although the non-transitory recording medium is not limited to a particular one, a recording medium, for example, a CD-ROM, a DVD-ROM, or the like may be adopted.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the gist.

The invention claimed is:

1. A communication control method used in a user equipment in a cell operated in an unlicensed band, the communication control method comprising:
when data to be transmitted from the user equipment to a base station is generated, performing by a PHY layer of the user equipment, Listen Before Talk (LBT) before transmitting the data;
transmitting a notification indicating a failure of the LBT, from the PHY layer to a MAC layer of the user equipment;
measuring by the MAC layer, a number of the LBT failure;
determining by the MAC layer, whether the number of the LBT failure reaches a threshold;
detecting by the user equipment, a radio link failure between the user equipment and the base station, in response to determining that the number of the LBT failure reaches the threshold;

performing by the user equipment, a dual connectivity in which another base station is operated as a master base station and the base station is operated as a secondary base station;

transmitting from the user equipment to the master base station, an SCG Failure Information message on the radio link failure, in response to detecting the radio link failure, wherein the SCG Failure Information message includes type information indicating a type of the radio link failure, and the type information indicates a failure due to the LBT failure; and when determining that the number of the LBT failure reaches the threshold:
performing, by the user equipment, LBT in another cell different from the cell; and
determining, by the user equipment, whether a number of the LBT failure in the another cell reaches the threshold.

2. A user equipment in a cell operated in an unlicensed band, the user equipment comprising a processor and a memory coupled to the processor, the processor configured to:
at a PHY layer of the user equipment, when data to be transmitted from the user equipment to a base station is generated, perform Listen Before Talk (LBT) before transmitting the data;
at the PHY layer, transmit a notification indicating a failure of the LBT, to a MAC layer of the user equipment;
at the MAC layer, measures a number of the LBT failure;
at the MAC layer, determine whether the number of the LBT failure reaches a threshold;
detect a radio link failure between the user equipment and the base station, in response to determining that the number of the LBT failure reaches the threshold;
perform a dual connectivity in which another base station is operated as a master base station and the base station is operated as a secondary base station;
transmit to the master base station, an SCG Failure Information message on the radio link failure, in response to detecting the radio link failure, wherein
the SCG Failure Information message includes type information indicating a type of the radio link failure, and
the type information indicates a failure due to the LBT failure; and
when determining that the number of the LBT failure reaches the threshold:
perform, by the user equipment, LBT in another cell different from the cell; and
determine, by the user equipment, whether a number of the LBT failure in the another cell reaches the threshold.

3. An apparatus controlling a user equipment in a cell operated in an unlicensed band, the apparatus comprising a processor and a memory coupled to the processor, the processor configured to:
at a PHY layer of the user equipment, when data to be transmitted from the user equipment to a base station is generated, perform Listen Before Talk (LBT) before transmitting the data;
at the PHY layer, transmit a notification indicating a failure of the LBT, to a MAC layer of the user equipment;
at the MAC layer, measures a number of the LBT failure;
at the MAC layer, determine whether the number of the LBT failure reaches a threshold;
detect a radio link failure between the user equipment and the base station, in response to determining that the number of the LBT failure reaches the threshold;
perform a dual connectivity in which another base station is operated as a master base station and the base station is operated as a secondary base station;
transmit to the master base station, an SCG Failure Information message on the radio link failure, in response to detecting the radio link failure, wherein
the SCG Failure Information message includes type information indicating a type of the radio link failure, and
the type information indicates a failure due to the LBT failure; and
when determining that the number of the LBT failure reaches the threshold:
perform, by the user equipment, LBT in another cell different from the cell; and
determine, by the user equipment, whether a number of the LBT failure in the another cell reaches the threshold.

* * * * *